U. KOHLER & C. STÖCKLIN.
SPEED COUNTER.
APPLICATION FILED APR. 16, 1914.

1,275,269.

Patented Aug. 13, 1918.
2 SHEETS—SHEET 1.

Witnesses:
Anna Hoyer.
E. Meyer.

Inventors:
Ulrich Kohler
and Charles Stöcklin

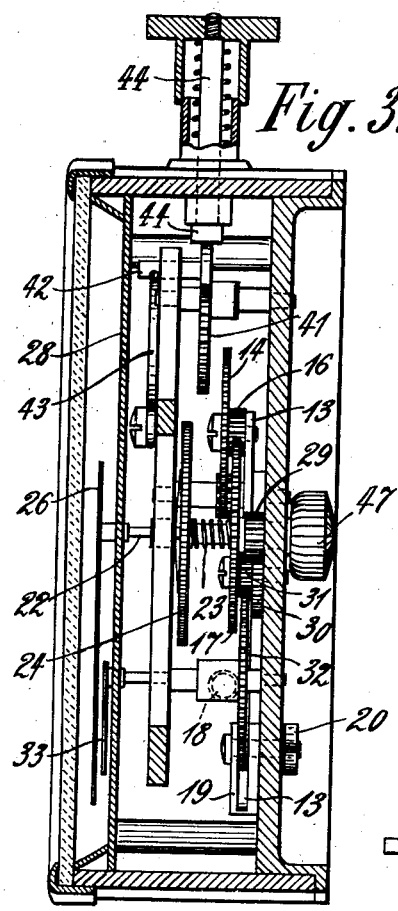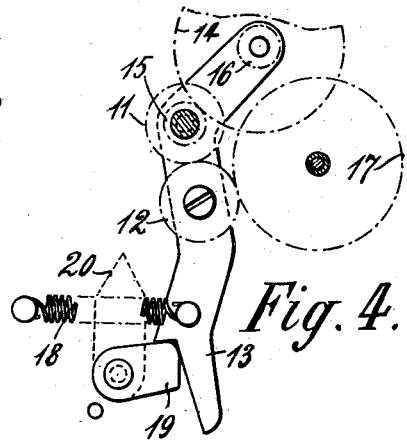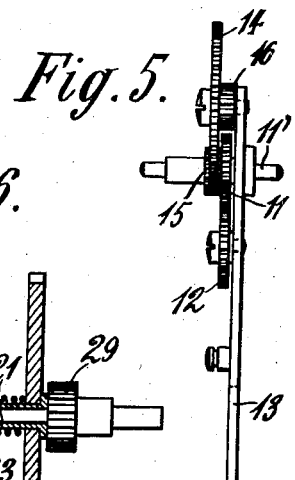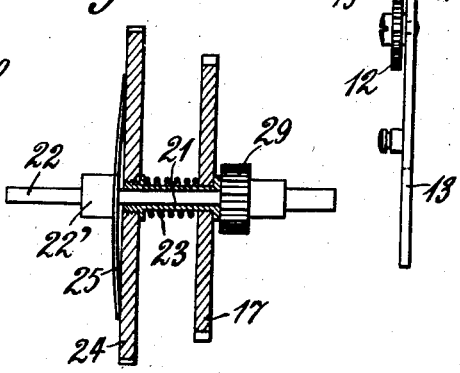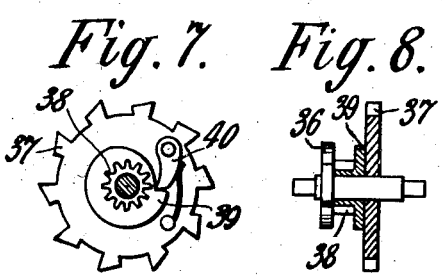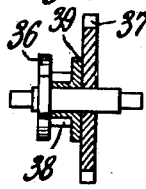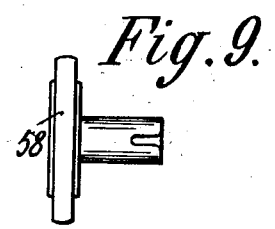

UNITED STATES PATENT OFFICE.

ULRICH KOHLER AND CHARLES STÖCKLIN, OF BERNE, SWITZERLAND, ASSIGNORS TO HASLER A. G. VORMALS TELEGRAPHEN-WERKSTÄTTE VON G. HASLER, OF BERNE, SWITZERLAND, A CORPORATION OF SWITZERLAND.

SPEED-COUNTER.

1,275,269.  Specification of Letters Patent.  Patented Aug. 13, 1918.

Application filed April 16, 1914. Serial No. 832,144.

*To all whom it may concern:*

Be it known that we, ULRICH KOHLER and CHARLES STÖCKLIN, citizens of the Swiss Confederation, and both residing at Berne, Switzerland, have invented certain new and useful Improvements in Speed-Counters, of which the following is a specification.

The number of revolutions and the velocities of moving bodies were measured heretofore in two different ways, viz: firstly, by means of simple counters of revolutions, the time being simultaneously noted, and, secondly, by means of tachometers.

The measurements according to the first method are liable to be incorrect on two grounds: Firstly, this method necessitates the counter being started at the same moment as the reading of the watch or clock, and this is always connected with an error owing to the two thoughts involved, apart from the error being liable to be increased by too rapidly and improperly pressing the counter against the part of the machine to be measured. Secondly, the duration of the measurements lasts, as a rule, one minute. This time of measurement can be shortened, it is true, to 15 seconds for example, but then it is necessary to make a calculation for obtaining the speed per minute and the above mentioned errors are increased. Further, the psychological error mentioned above is repeated at the end of the measurement, if the measuring operation does not cease automatically.

The measurements according to the second mode of operation by means of hand tachometers are more rapid, almost instantaneous, but are generally too inexact.

The most accurate tachometers on the so-called positive principle, *i. e.* those comprising a pointer which is temporarily driven by clockwork, are not handy because too heavy and they are too complicated and therefore too expensive; in addition, they require much power. Such a tachometer is, for example, shown in Patent 730,298 of 1903. The hand tachometers used most largely are based on the rotary pendulum or the rotary magnetic field principle. These apparatus have to be empirically adjusted and their accuracy is not uniform as they are influenced by internal weakening forces or external changes of temperature.

Another defect of all tachometers having one dial only is that their measurements can take place at most during one single revolution of the pointer whether the division of the dial is from 0 to 100, for example, or from 0 to 10,000, so that the degree of accuracy in the readings varies greatly and is very limited.

A primary object of our invention is to provide an improved speed counter in which these defects are avoided.

Accordingly, in our improved tachometer comprising clockwork and indicating mechanism adapted to be driven by the driving shaft, we connect the indicating mechanism in such manner by a locking member with the clockwork that it is liberated automatically only during one single exactly predetermined interval of time which is a fraction of the relative time of measurement.

To these ends, our invention consists in the construction, arrangement and combination of parts described hereinafter and pointed out in the claims.

One illustrative embodiment of our invention and modifications of details thereof are represented by way of example in the accompanying drawings, wherein:—

Fig. 3 is a section taken on the line III—III in Fig. 2;

Fig. 4 shows details of the gearing, and Fig. 5 shows the same as seen from the right of Fig. 4;

Figs. 6 and 7 are detail views on an enlarged scale, Fig. 8 is a section through the device shown in Fig. 7, and Fig. 9 shows a detail.

Figure 1:
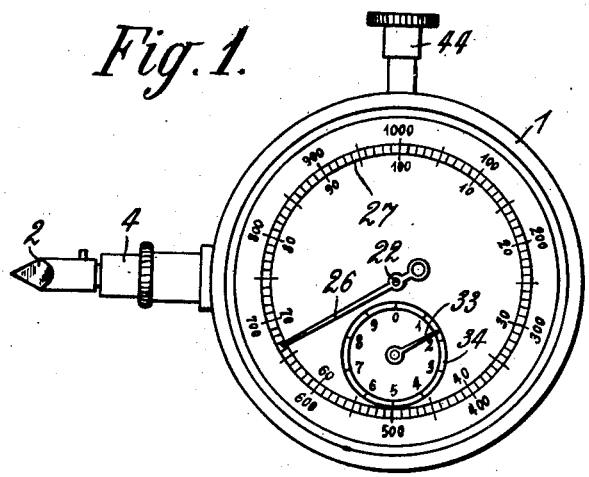
Figure 1 is a side elevation of a preferred form of our improved speed counter showing the dial.
Figure 2:
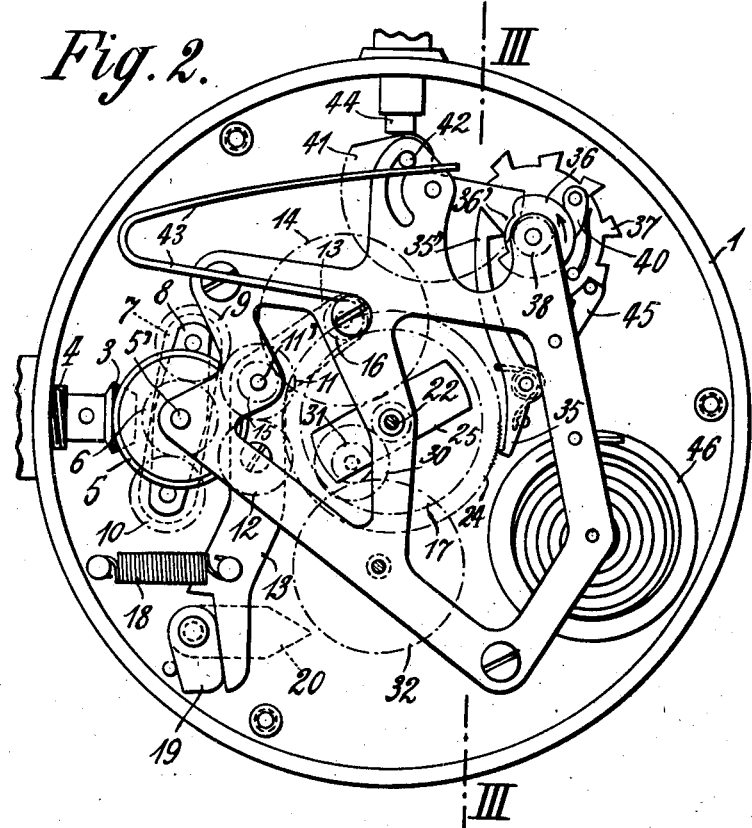
Fig. 2 is a like view thereof, enlarged, the dial having been removed.

According to Figs. 1 to 9, the speed counter comprises a cylindrical casing 1 into the interior of which projects a driving shaft 4 which carries on its outer end a three-sided point 2 and on its inner end a bevel-gear 3. This gear meshes with a bevel-gear 5 on whose shaft 5' is fastened a pinion 6. The latter meshes with two spur-gears 9, 10 journaled in the ends of a two-armed lever 7, free to turn about the shaft 5'. A flat spring 8 bears in the middle against the bevel-gear 5. In consequence of the friction between the spring 8 and the bevel-gear 5, when the direction of rotation of the driving shaft changes the lever 7 carrying the gear wheels 9, 10 is turned from its one end position into the other. In the one end position of the lever 7 the gear wheel 9 meshes with a gear wheel 11 and in the other end position the gear wheel 10 meshes with a gear wheel 12. These wheels 11 and 12 are directly positively connected with one another, and owing to the rectifying device comprising the members 5 to 10 are always rotated in the same direction in whichever direction the driving shaft 4 is driven. Rotatable about the axle 11' of the gear wheel 11 is a two-armed lever 13 (Figs. 2, 4 and 5) on whose one arm the wheel 12 is journaled and on its other arm a gear wheel 14. This gear wheel meshes on the one hand with a pinion 15 rigidly connected with the gear wheel 11 and is rigidly connected on the other hand with a pinion 16. In the one end position of the lever 13 the pinion 16, and in the other end position the pinion 12 meshes with a gear wheel 17 of the indicating or pointer mechanism (Figs. 2 and 4). The ratio of the two speeds of the pointer wheel 17 is as 1:10 so that in the one end position (Fig. 4) of the lever 13 the pointer wheel 17 is rotated ten times as quickly as in the position of the lever 13 according to Fig. 2. In the former case the inner scale on the dial will be read and in the latter case the outer. The lever 13 is pulled by means of a coil spring 18 against a cam 19, the position of which can be changed by means of a grip 20 located outside the casing. As shown in Fig. 6, the pointer wheel 17 is loosely mounted on a sleeve 21 which is likewise free to rotate on the shaft 22. The pointer wheel 17 is pressed by means of a coil spring 23 against a flange on the sleeve 21, so that the latter is rotated by friction. On the one end of the sleeve 21 is screwed an arresting disk 24 having a finely serrated periphery, against which disk the ends of a flat spring 25 bear; the middle portion of this spring bears against a collar 22' on the shaft 22. In consequence of friction between the spring 25 and the collar 22' the shaft 22 is rotated when the disk 24 rotates. The shaft 22 carries a pointer 26 (Figs. 1 and 3) which moves in operative relation with a complete circular scale 27 on a dial 28 mounted in the casing. The scale 27 is such that the result of the measurement can be read on it directly, i. e., without calculation. The shaft or axle of the pointer carries a pinion 29 which is positively connected by means of two gear wheels 30 and 31 with a gear wheel 32 whose axle carries a pointer 33 which rotates in operative relation with a scale 34 and travels one division of the scale when the pointer 26 makes one complete revolution. The pointer 33 thus indicates up to 10 revolutions of the pointer 26 during the measurement, so that very high speeds or a large number of revolutions can be exactly measured or counted.

The pointer mechanism or the serrated wheel 24 is generally prevented from rotating by a double pawl 35, 35', which is yieldingly pressed against the periphery of the wheel 24. The end 35' of this pawl bears against the periphery of a cam 36 having a recess 36'. When the pawl takes into this recess it also takes into the serration of the wheel 24, but if it is located outside the said recess it is then lifted clear of the periphery of this wheel and releases the same and the pointer mechanism. The cam 36 is mounted on the same shaft as the escapement wheel 37 of a driving mechanism or clockwork which is used for automatically releasing and arresting the pointer mechanism during an exactly predetermined interval of time constituting a fraction of the relative time of measurement. As clearly shown in Fig. 8, between the escapement wheel 37 and the cam 36 is located a pinion 38 provided with a cam 39. A pawl 40 is elastically pressed against the periphery of this cam; this pawl is mounted on the escapement wheel in such manner that when the pinion 38 rotates in the one direction the escapement wheel remains stationary, whilst in the other direction of rotation the pawl 40 abuts against the shoulder of the cam and thereby rotates the escapement wheel. A toothed sector 41 meshes with the pinion 38. This sector carries a pin 42 against which bears a spring 43 which tends to hold the sector 41 in the position shown in Fig. 2 or to rotate the same into this position. The sector 41 can be turned against the action of the spring 43 by pressure upon an outwardly spring-pressed radial pin 44 which projects through the wall of the casing. After the pin 44 has been released the sector 41 or the driving mechanism, which comprises in addition to the escapement wheel 37 and the cam 36 an anchor 45 and a balance spring 46, is actuated and the cam 36 is turned in the direction of the arrow shown in Fig. 2. The rear end of the axle 22 of the pointer projects through the wall of the casing and carries a turn button or grip 47 by means of which the pointer mechanism can be directly turned by hand and adjusted to zero, for example.

Fig. 9 shows a disk 58 to be placed over the point 2 for enabling the peripheral velocity or the speed of travel of a member to be measured by the speed counter. The periphery of the disk 58 is pressed against the periphery of the said member whose speed of rotation is to be measured.

The described speed counter operates as follows:

When the pointer has been adjusted to zero the speed counter is connected with the shaft to be measured by pressing the point 2 into the center in the end of the shaft. The wheels, 3, 5, 6, 9, 10, 11, 12, 15, 14, 16 and 17 are rotated, while the pointer mechanism remains stationary in consequence of its being arrested by the pawl 35, 35', and the clockwork is also stationary owing to its not being wound up. Then, by pressing the pin 44 inward the spring 43 is tensioned and the clockwork is wound up, the segment 41 being turned backward. This segment rotates the pinion 38 and the cam 39 firmly connected therewith rather more than one revolution backward, so that the pawl 40 mounted on the escapement wheel reliably takes behind the projection of the cam 39. In this position the pawl 40 is ready to rotate the wheel 37 and the cam 39 under the action of the spring 43 exactly one revolution in the direction of the arrow shown in Fig. 2. When the pin 44 is pressed inward insufficiently so that the spring 43, the escapement wheel 37 and the cam 36 cannot rotate forwardly a complete revolution, then the pawl 40 is not located in front of the projection of the cam and is therefore unable to rotate the cam when the pin 44 is released. Consequently the pointer mechanism is not released and no incomplete or incorrect measurement is made. In order to measure at all it is necessary to bring the pawl 40 into engagement with the projection of the cam 39 so that when the pin 44 is released the cam 36 actually rotates one complete revolution. When the pointer mechanism has been correctly coupled with the shaft 4 for driving the same the pin 44 is released, whereupon the clockwork is driven, and the pointer mechanism is released or the connection between the driving shaft 4 and the pointer mechanism is automatically established. The clockwork is so regulated that this connection lasts exactly 3 seconds for example. At the end of this time, which is a fraction of the relative time of measurement, *i. e.* that time over which the measurement extends *e. g.* one minute, the connection between the driving mechanism and the pointer mechanism is automatically broken or the latter mechanism is arrested. The result of the measurement can then be read on the dial and remains visible until a new measurement is made or until the pointers are adjusted to zero by hand by means of the grip or button 47.

The outer numbers of the large scale may relate, for example, to measurements of revolutions, and the inner to velocities of travel. As will be readily understood from the above, measurements can be made without the aid of an ordinary watch or clock.

We claim:—

1. In a speed counter the combination with a driving mechanism of a pointer mechanism adapted to be driven thereby, a locking member normally holding said pointer mechanism at rest, a rotatable cam disk adapted to temporarily withdraw said locking member, and a clock-work controlling the rotation of said cam disk the said locking member being directly controlled by said cam disk so as to release the said pointer mechanism only after said cam disk has obtained its normal regulated speed, the said cam disk after the completion of one revolution causing the automatic arrest of the said clock-work.

2. In a speed counter the combination with a driving mechanism of a pointer mechanism adapted to be driven thereby, a locking member normally holding said pointer mechanism at rest, a clock-work comprising an escapement wheel, a cam disk mounted on the shaft of said escapement wheel and adapted to temporarily withdraw said locking member, a cam in connection with said escapement wheel, a pawl engaging said cam so as to rotate it in one direction only, and a spring-actuated driving wheel, the said cam disk being so constructed and arranged as to control said locking member in such a manner to release the said pointer mechanism only after the said cam disk has attained its normal regulated speed.

3. In a speed counter the combination with a driving mechanism, of a pointer mechanism adapted to be driven thereby, a locking member normally holding said pointer mechanism at rest, a clock-work comprising an escapement wheel, a cam disk mounted on the shaft of said escapement wheel and adapted to temporarily withdraw said locking member, a cam in connection with said escapement wheel having a single projection, so as to carry with it the escapement wheel in one direction only, a spring controlled sector for rotating said cam, a manually operated member adapted to act in opposition to the spring controlling said sector, the arrangement being such that the said cam disk will be rotated to withdraw the said locking member thereby allowing the said pointer mechanism to operate only when the said cam has been completely operated whereby the taking of a measurement in less than the predetermined period of time is prevented.

In testimony whereof we affix our signatures in the presence of two witnesses.

ULRICH KOHLER.
CHARLES STÖCKLIN.

Witnesses:
 HANS RINDERKNECHT,
 FREDERICH MONING.